United States Patent [19]
James et al.

[11] Patent Number: 5,922,093
[45] Date of Patent: Jul. 13, 1999

[54] ULTRA-FILTRATION VACUUM SYSTEM

[75] Inventors: Randy Bruce James, Salt Lake City; Michael John Edgington, Midvale; Guy Merideth Hatch, Logan, all of Utah

[73] Assignee: Miracle Marketing Corporation, Salt Lake City, Utah

[21] Appl. No.: 08/949,742

[22] Filed: Oct. 14, 1997

Related U.S. Application Data

[63] Continuation-in-part of application No. 08/637,611, Apr. 25, 1996, abandoned.

[51] Int. Cl.$^6$ .................................................. B01D 47/02
[52] U.S. Cl. .............................. 55/322; 55/337; 96/318; 96/321; 96/336; 96/347; 96/350; 96/352; 96/364
[58] Field of Search ................ 55/318, 322, 327, 55/337; 96/318, 321, 335, 336, 337, 347, 349, 350, 352, 364, FOR 127, FOR 140, FOR 145, FOR 155

[56] References Cited

U.S. PATENT DOCUMENTS

| | | |
|---|---|---|
| 240,320 | 4/1881 | Mallinckrodt . |
| 1,012,089 | 12/1911 | Mackay ..................................... 55/318 |
| 1,110,868 | 9/1914 | Bauer . |
| 1,960,260 | 5/1934 | Acton . |
| 1,996,604 | 4/1935 | Anglemeyer . |
| 2,007,759 | 7/1935 | Harmon . |
| 2,087,219 | 7/1937 | Dorfan . |
| 2,143,144 | 1/1939 | Fagerberg . |
| 2,184,731 | 12/1939 | Brewer . |
| 2,230,453 | 2/1941 | Fitch . |
| 2,233,167 | 2/1941 | Holm-Hansen ............................. 15/16 |
| 2,259,032 | 10/1941 | Fisher ....................................... 261/18 |
| 2,272,995 | 2/1942 | Neuman . |
| 2,380,065 | 7/1945 | Newcomb . |
| 2,406,278 | 8/1946 | Worth . |
| 2,466,503 | 4/1949 | Stokes et al. . |
| 2,507,672 | 5/1950 | McAllister . |
| 2,673,619 | 3/1954 | Martin . |
| 2,756,976 | 7/1956 | Jalma ....................................... 261/36 |
| 2,954,095 | 9/1960 | Brock . |
| 3,331,194 | 7/1967 | Reed et al. . |
| 3,537,239 | 11/1970 | Dunmire ................................... 96/364 |
| 3,546,851 | 12/1970 | Hardison et al. . |
| 3,812,657 | 5/1974 | Lampinen . |
| 3,881,895 | 5/1975 | Wattles . |
| 3,930,281 | 1/1976 | Principe et al. .......................... 15/320 |
| 4,623,366 | 11/1986 | Berfield et al. . |
| 4,693,734 | 9/1987 | Erickson, Jr. . |
| 4,731,101 | 3/1988 | Kanda ..................................... 55/323 |
| 5,192,344 | 3/1993 | House ..................................... 96/349 |
| 5,199,963 | 4/1993 | Scarp . |
| 5,287,591 | 2/1994 | Rench et al. ............................. 55/337 |
| 5,348,562 | 9/1994 | Burrous et al. . |
| 5,435,817 | 7/1995 | Davis et al. ............................. 55/337 |

FOREIGN PATENT DOCUMENTS

| | | |
|---|---|---|
| 590894 | 6/1925 | France . |
| 231463 | 3/1944 | Switzerland . |
| 1344394 | 10/1987 | U.S.S.R. . |
| 1761228 | 9/1992 | U.S.S.R. . |
| 372426 | 5/1932 | United Kingdom . |

*Primary Examiner*—C. Scott Bushey
*Attorney, Agent, or Firm*—James L. Sonntag

[57] ABSTRACT

An ultra-filtration vacuum system with a first liquid stage filter and that has structure to direct particle laden air into a vortex in a circular cyclone chamber over a surface of a first liquid filter medium to direct particulates in the air to a wall of the cyclone chamber for collection by the first liquid filter medium. An open-pore labyrinth filter is provided for further filtering air from the first liquid stage. A second liquid stage is provided to filter for filtering air from the labyrinth filter and has a dispersion chamber with an inlet that directs the particle laden air from the labyrinth filter directly into a second liquid filter medium to transfer momentum of the air directly to the second liquid filter medium, the dispersion chamber constructed with surfaces against which medium is propelled by the energy of the injected air to disperse the medium in the air, the dispersion chamber shaped such that a cascading and undulating liquid surface is formed.

12 Claims, 8 Drawing Sheets

ULTRA-FILTRATION VACUUM SYSTEM

RELATED APPLICATION

This application is a continuation-in-part of application Ser. No. 08/637,611, filed Apr. 25, 1996, now abandoned.

FIELD OF THE INVENTION

This invention relates to ultra-filtration vacuum cleaner systems for separating fine particulates from the air.

BACKGROUND OF THE INVENTION

For filtering particulates from air in a vacuum cleaning system, the basic goal is to remove particulate matter from the air passing through the system while maintaining an efficient air flow. Mechanical filters are frequently used, but can quickly become covered by filtered material and saturated with a cake of filtered material, reducing the efficiency of the air flow through the filter.

Cyclone type vacuum cleaners are known in the art, as disclosed, for example, in U.S. Pat. No. 2,233,167 to Holm Hansen. This system functions as a centrifugal separator wherein incoming air is formed into a whirling annulus or cyclone. The solid particulates in the air, by virtue of their inertia, tend to move to and impinge the outside wall where they impact and settle into a collector or dust receptacle. In the Holm-Hansen system, water in the collector is driven by the whirling air into a wave the travels around the dust-receptacle, wetting and washing the wall. These systems work well to "rough clean" the air before extraction of the finest particles in the air by a mechanical filtration system. These systems work well, but unfortunately such a single-stage cyclone system as typically used in vacuum systems fails to remove enough of the mid-range particulate to prevent premature caking of the final solid filter. Thus the final filter must be frequently replaced, and that filter is inefficiently used. The final filter is designed to remove the finest particles, but becomes quickly clogged and inoperative by large and mid-range particles. This is especially problematic when the mechanical filter uses an ultrafine material, such as an expensive HEPA medium.

Another problem with cyclonic systems, like the Holm-Hansen system, that the particle removal, which depends upon the swirling of water by the air flow along the outer wall of the cyclone container, the removal efficiency often depends on the amount of liquid and level of liquid in the system. Usually a relatively small amount of liquid is used to maintain the optimum action, but the liquid quickly becomes over-burdened with particulate material, reducing its effectiveness. In addition, when such a system is used as a "wet-vacuum," such as to remove water from a flooded carpet, the cyclone fluid chamber becomes over-filled with water and effective particulate entrapment stops.

OBJECTS OF THE INVENTION

It is, therefore, an object of the invention to provide a vacuum cleaning system that avoids the problems of previous systems.

It is an object of the invention to provide a vacuum cleaning system that is more efficient in removing both coarse and fine particulate materials than previous systems using liquid medium filters and mechanical medium filters.

It is also an object of the invention to provide a vacuum cleaning system that is both wet and dry, capable of removing both wet and dry substances from an air stream without modification of the system.

It is also an object of the invention to provide a vacuum cleaning system with ultra-filtration that comprises a staged system wherein each stage is operated at its optimum particle size removal and stages are prevented from becoming over-utilized or clogged by over-size particles.

It is further an object of the invention to provide a vacuum filter system that can be placed before an ultrafine mechanical filter to remove the bulk of particles other than ultrafine particles to prevent a premature clogging of the filter.

Yet another object of the invention is to provides a vacuum cleaning system that provides an improved removal of particles, and that is portable and easily used in house cleaning, janitorial and portable industrial applications.

Further objects of the invention will become evident in the description below.

SUMMARY OF THE INVENTION

The invention solves the problems of the prior-art by providing a new filtration system that uses a specifically ordered staged system of liquid medium, labyrinth, and mechanical filters to entrain particles from the air. Unlike conventional mechanical filters, it does not quickly become clogged with filtered particulates. The filter of the invention is also more efficient than prior-art cyclone systems that use liquid filter media, particularly in removing mid-size particles that are only poorly removed by a cyclone system.

The present invention is particularly suited for home and small-scale industrial/janitorial applications presently served by portable vacuum cleaner systems. In its preferred embodiment, the present invention comprises an upright, barrel-shaped container. Internally, the particulate extraction process is performed by a succession of filtration stages. First, the intake air, that has entrained solid particles of varying size distribution and any liquid water, is drawn first into a first liquid stage where the air flow is directed tangentially within a large cylindrical-shaped chamber. As the air flow and particulate matter swirl about the inside of this chamber, heavier particulate material and/or liquid moves, by centrifugal force, to the peripheral wall of the chamber and falls, by gravity, to the bottom of the chamber which is partially filled with a liquid. Thus, a substantial portion of liquids and larger particles suspended in the air stream, along with varying amounts of the smaller particulates, are removed from the air stream. The liquid is preferably a prepared chemical solution comprising water, low-sudsing surfactant, a disinfectant (also serving as an anti-static agent) and odor-modifying agents. The liquid filled chamber also acts as a holding vessel and has a high capacity to contain entrained liquids in the air.

The air, which still contains suspended, some remaining mid- and fine-range particulate material, exits upwardly from the cyclone chamber via a centrally-located tube and is conveyed from the first-stage by ducts to a second liquid stage.

Before entering the second liquid stage, the air stream is passed through a labyrinth filter, from which it passes into the second liquid stage, which comprises a liquid dispersion chamber. The second liquid stage with labyrinth filter is located circumferentially inside the first cyclone stage, to save internal space. The labyrinth filter provides a convoluted air path, such that the greater mass of entrained solid and liquid particles causes the particles to collide with the surface of the filter medium, upon which the particles are retained. This filter has large pores such that it has a large air permeability, i.e., it cannot become easily clogged with the particulates in the air stream, and there is a small pressure drop across the filter. The filter is constructed to provide a convoluted or labyrinth path through the filter, such as provided, for example, by low density open foams or random fiber non-woven materials. However, any material that provides convoluted or labyrinth air pathways and is compatible in the environment is contemplated.

After leaving the labyrinth filter, the air stream enters the dispersion chamber of the second liquid stage. The second liquid stage is also partially filled with liquid, preferably a prepared chemical liquid filter medium comprising water, low-sudsing surfactant, a disinfectant (also serving as an anti-static agent) and odor-modifying agents. In the dispersion chamber, the air flow is directed to the lower periphery of the liquid chamber, where it is released directly into the liquid under the liquid surface. The channel through which the air is conveyed imparts a directional momentum to the air that is tangent to the outer wall of the chamber. Upon release directly into the liquid filter medium, the air stream transfers this momentum to the water such that a vigorous mixing action between the air and the filter medium is induced. The vigorous mixing action is induced by the rapid injection into the filter medium, resulting in rapidly rising air bubbles, and the circular, swirling action of the water induced by the tangential injection of the air. The swirling liquid medium flows up the periphery of the round-walled chamber. As the kinetic energy of the moving water is expended by the work of lifting the water, as well as by friction against the wall of the vessel, the water falls back to the bottom of the chamber. The net result is an irregularly-shaped wall of water resulting from the lifting and cascading action of the water. Particulate material in the air impacts this wall of water as the air bubbles and swirls upward within the more central portion of the dispersion chamber. Simultaneously, the rising air bubbles create a dispersion of liquid and air, with liquid continuously being thrown against and ricochetted off of the sides of the dispersion chamber. It has been found that this highly dispersed liquid in the air thus created, and the cyclonic effect against the water-wall materially increases the collection efficiency for small and medium-sized particles as compared to a solid static wall used in prior-art cyclone systems. This is even the case where the prior-art wall is wetted and washed by air induced waves as in the Holm-Hansen cyclone system. The present system, the swirling and cascading action of the water, and violently mixing liquid and air, and the rapid injection of air directly into the liquid medium increases the surface area of the liquid, which improves the probability of impact and entrainment by the liquid.

The collection efficiency of the filter is further increased by chemical additives dissolved in the water which reduces the static electrical charge of the air and the surface tension of the water, both of which enhance the adhesion of the particles to the water surface.

Air from the second liquid stage filter stage then flows upward and out past two circular openings (plenums) in the top of the chamber designed to collect liquid in the water and prevent the liquid from flowing into the motor fan chamber. The air then flows directly to the vacuum fan unit and is exhausted to atmosphere or, to achieve the maximum extraction of particulates, the air preferably flows through a cartridge type filter before exiting the vacuum.

A particular advantage of the present system over previous systems is that it can function as a wet vacuum or a dry vacuum without any modification, i.e., simultaneously as a wet and dry vacuum. This contrasts with the prior-art systems such as wet vacuum cyclone systems. If, for example, a dry fine particulate material, such as large amounts of plaster dust or paint pigment, is passed into a conventional wet cyclone vacuum system, the large amount of dust can only be partially collected resulting in dry and damp dust collecting upon the top surface of the liquid. The large amount of damp dust not collected by the cyclone filter passes through and quickly collects on and clogs the mechanical filters that are usually placed after the cyclone filtration. Thus, these systems, after only a short period of operation with dry powders, become clogged and lose their function. For a dry vacuum apparatus, if there is any liquid entrained in the air stream, the fine powder becomes damp and quickly cakes and clogs the filters. In any case, cyclone filters, either wet or dry, leave a significant portion of dust in the air leaving the initial cyclone filter, which overloads and clogs any final mechanical filter.

The present vacuum apparatus is characterized in part by a unique staged filter system that is designed to optimally remove a successively smaller particle size of particulate material so that succeeding filters are poorly utilized by removing large particles which clog and compromise their filtration. The result is a filtration that is much more effective than simple cyclone filters. The filtration is not affected by the presence or absence of any liquid in the incoming air stream, or by the consistency of the particulate, whether damp, dry, or caked.

In the present invention, a cyclone prefilter removes the substantial portion of the large particle distribution and the liquids. Then in conjunction with a labyrinth filter and a liquid dispersion filter, essentially all of the remaining fine to large particles are removed, leaving a remnant comprising mostly the finest particles in the air stream. The use of splash plate baffles at the exit of the second liquid stage protects the final mechanical filters by removing entrained liquid in the air stream. Thus, the mechanical filters are not damaged by liquids, or prematurely clogged by medium to large particles. Basically, the present system functions for a wide range of particulate solids, ranging from very fine pigments and dusts, to coarser materials. The invention is completely satisfactory for certain difficult environments, such as for large amounts of plaster dust, that can only be handled with difficulty and frequent changing of mechanical filters of previous systems. In addition, the superior function of the invention is essentially independent of presence or lack of water or other liquids in the solid particulate materials or in the air stream.

The system of the present invention relies upon a carefully designed staged system for its superior function. The order of the stages is such that the particle removal is efficient and no stage is used inefficiently for large amounts of particles much larger than the filter design, so that is does not become prematurely overcome or clogged. Each stage is used in the system where it is most efficient and can most efficiently extract air laden particles. For example, the cyclone stage is used as the initial stage because of its ability to remove large particles in the initial input stream. The subsequent stages, which are more efficient for removing smaller particles, are thus more efficient because they protected from those large particles. The labyrinth filter removes particles over a broad size range, but removes large amounts of medium and fine materials, leaving mostly fine particles for the dispersion chamber filter, which is most efficient at removing small to mid-range particles. Since larger particles have been removed by a preceding filter, the filtering capacity of these filters is used in their most efficient capacity and mode of operation. The air-stream leaving the dispersion filter, is thus essentially free of all but the finest particles.

The finest particles are then removed by a final fine-pore mechanical filter. Large and mid-size particles that would ordinarily prematurely clog these filters have already been removed from the air-stream, so mechanical filters function primarily in their most efficient manner by removing mostly just very fine particles.

DETAILED DESCRIPTION OF THE INVENTION

Figure 1:
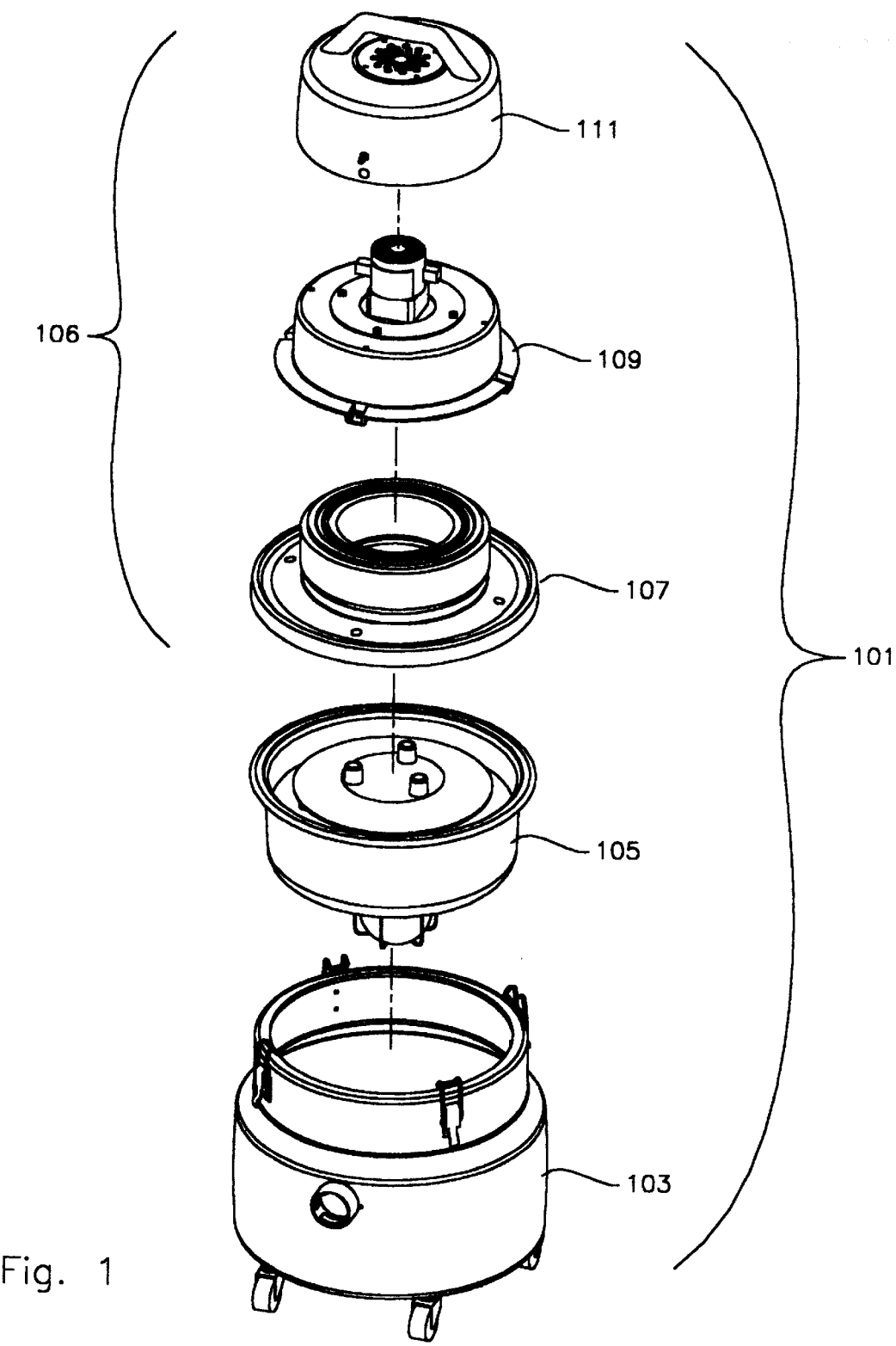
FIG. 1 is an exploded view of an apparatus of the invention.

FIG. 1 is an exploded perspective view of a vacuum apparatus of the invention 101. The apparatus comprises a first liquid filter stage 103, a second liquid filter stage 105, a third filter stage comprising a mechanical filter section 107, a fan section 109, and a top cover 111.

Figure 2:
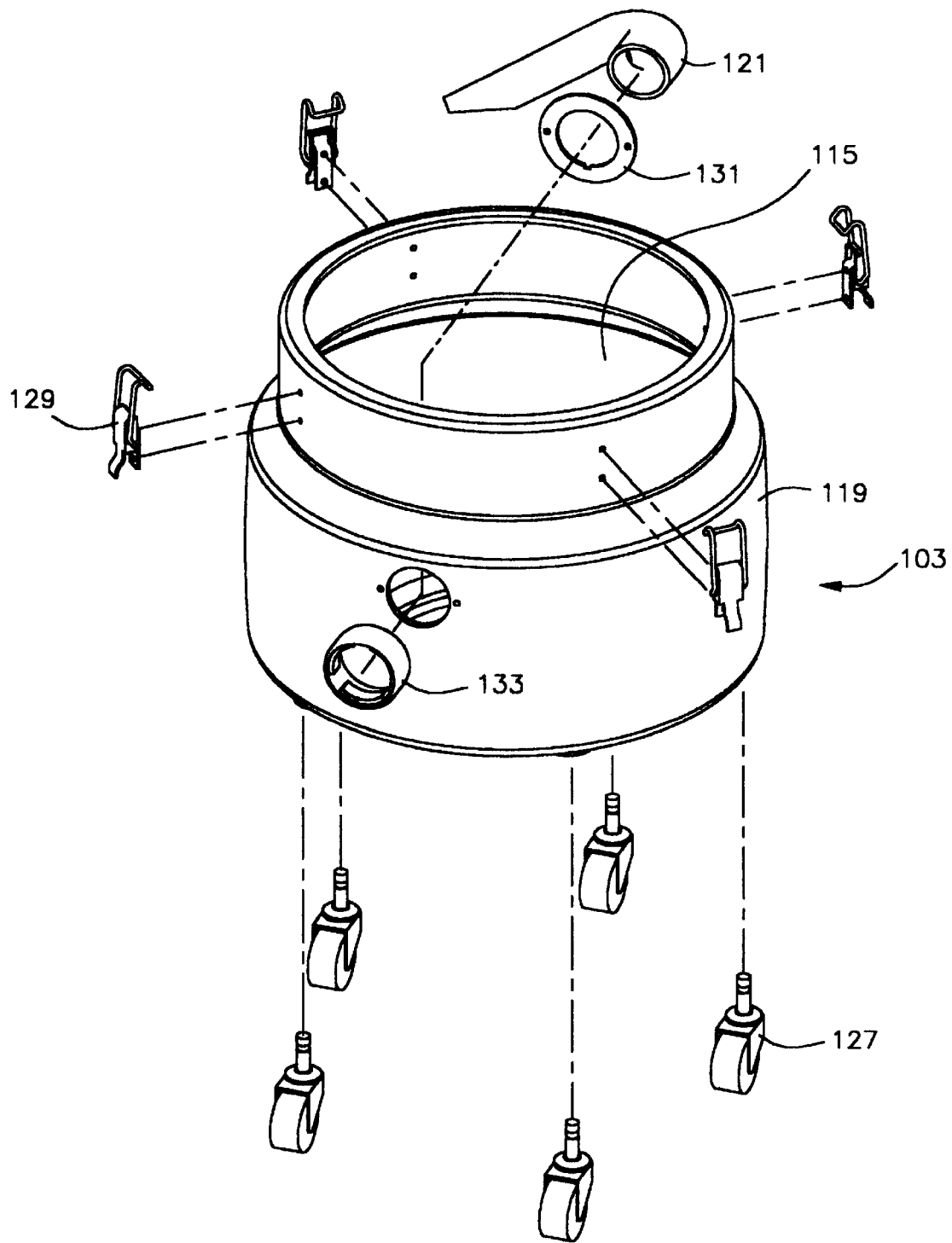
FIG. 2 is a perspective exploded view of the first filter stage of the apparatus of FIG. 1.
Figure 3:
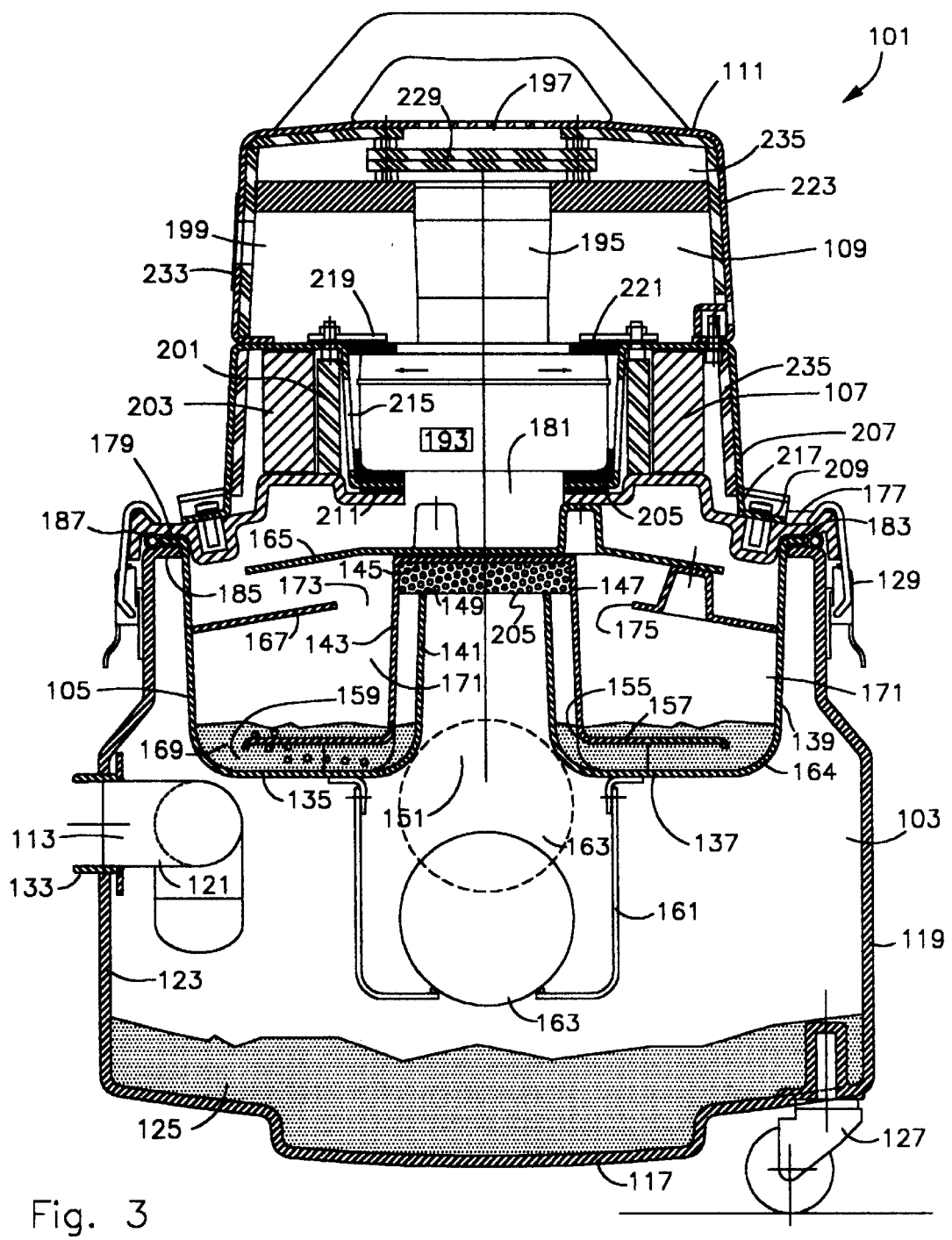
FIG. 3 is a cross-section of the apparatus of FIG. 1 along the center vertical axis.
Figure 4:
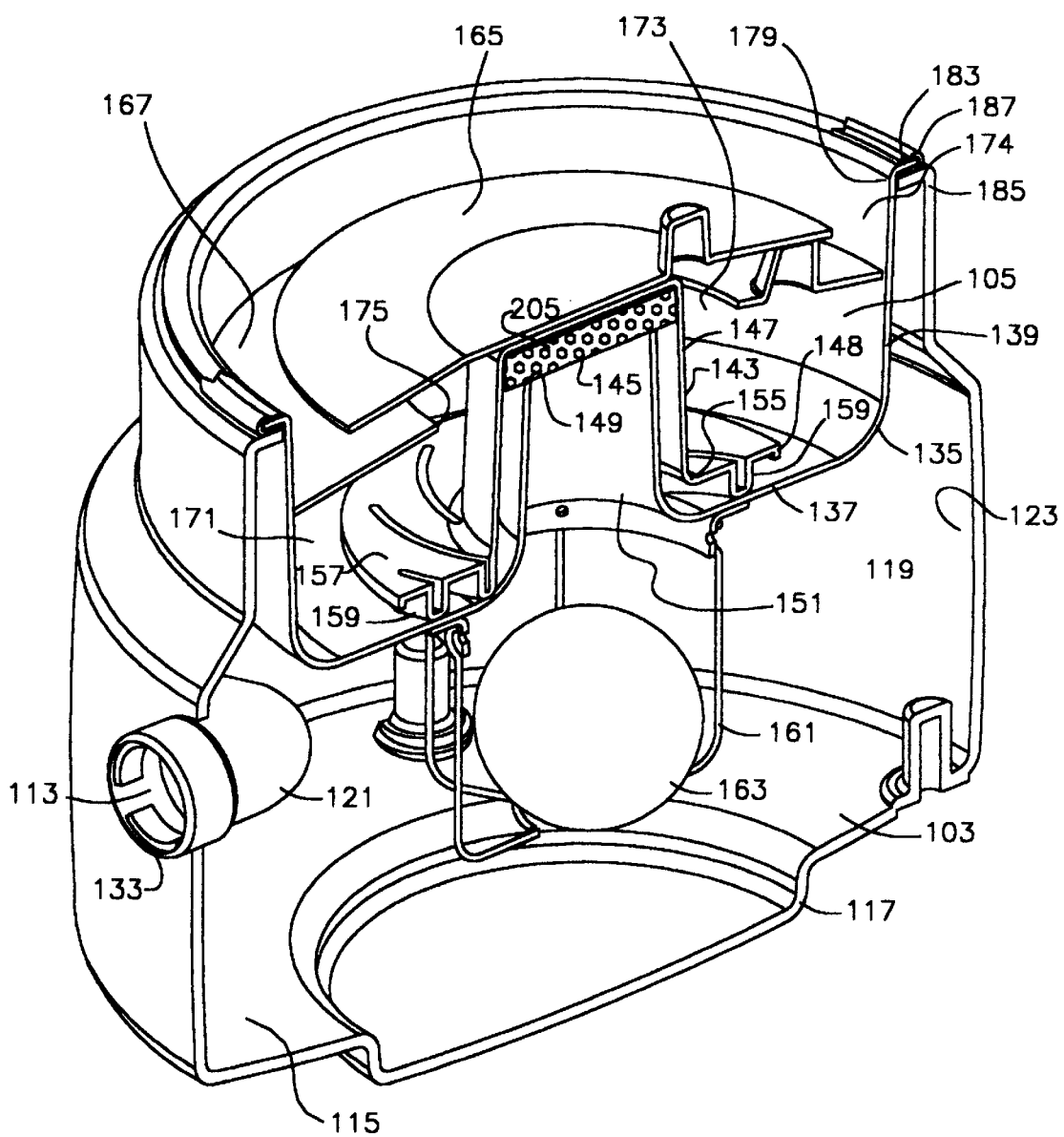
FIG. 4 is a perspective view of the first and second liquid filter stages with cutaway of the apparatus of FIG. 1.

Reference is made to FIG. 2, which is an exploded view of the first filter stage 103 and FIG. 3, which a vertical cross-section of the apparatus 101 of the invention, and FIG. 4, which is a perspective view with a cut-away. Particle laden air is drawn through air intake 113 into cyclone chamber 115, which is a generally barrel shaped chamber with a bottom wall 117 and a generally vertical cylindrical side wall 119. The air is directed by a plenum 121 on the air intake to travel tangentially around the chamber to induce the cyclonic action of the air. Particles in the air, mostly the middle to larger sized particles and/or liquid droplets along with portions of other sized particles, are driven to the circumference of the cyclone chamber by centrifugal force, where they impact the inner surface 123 of the cylindrical side wall 119 and are collected by falling to bottom of the chamber 115. Preferably, the plenum is directed at an angle downwards, such as 20° to 45°, toward the liquid surface to increase particle entrainment and a turbulent wave action of the liquid. A filter medium 125 in the bottom collects the falling particles. The tangentially moving air also causes wave action that intermittently washes and wets the inner surface of the side wall. The cyclone stage 103 is supported in an upright vertical position by suitable casters 127. The size of the cyclone stage 103 is such that it supports the subsequent stages and such that the assembled vacuum system 101 can easily be moved upon the casters 127 by pulling an inlet hose (not shown) attached to the air intake. At the air intake 113 is provided a hose attachment sleeve 133, for a bayonet attachment to the inlet vacuum hose or the like for securing the plenum 121 and the attachment sleeve 133 to the vertical wall using suitable fasteners, such as rivets or the like.

Figure 5:
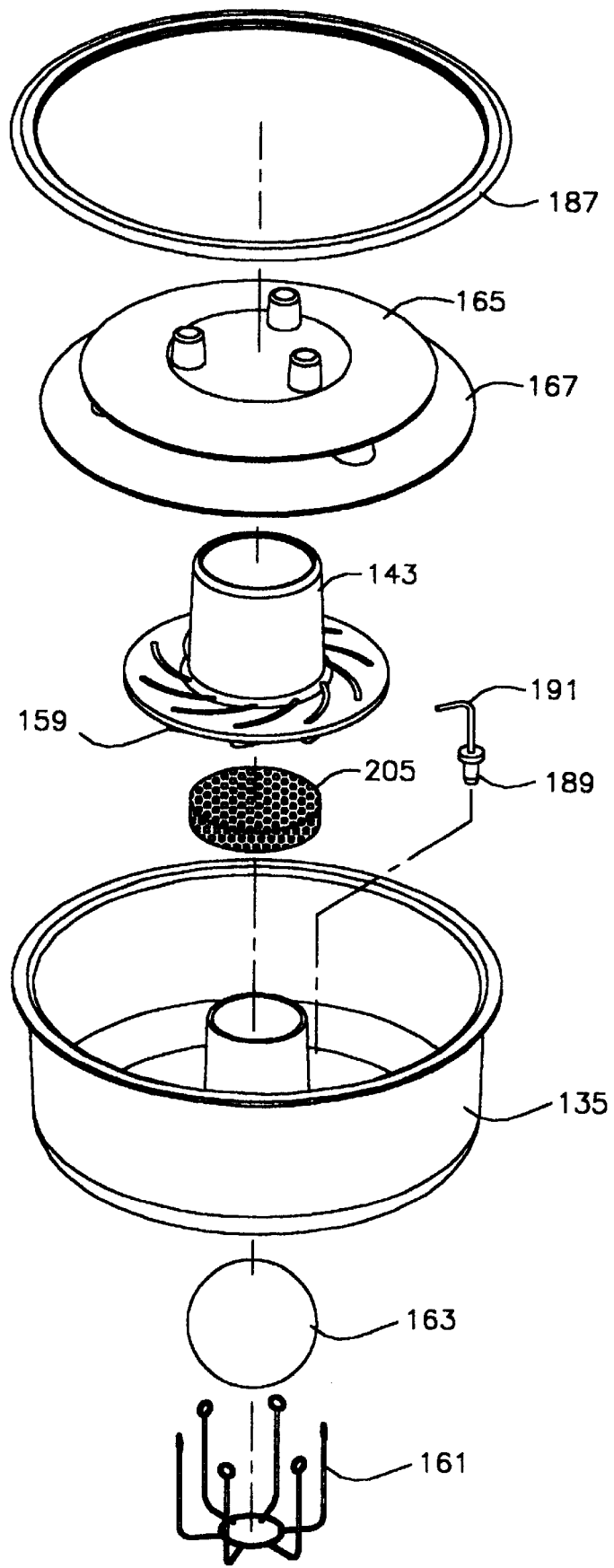
FIG. 5 is an exploded view of the second liquid filter stage of the apparatus of FIG. 1.

Reference is now made to FIGS. 3 and 4, and also FIG. 5, which is an exploded view showing the second liquid filter stage 105 and labyrinth filter 205. From the first liquid stage 103 air enters the second liquid filter stage 105 through a labyrinth filter 205. The second liquid filter stage 105 comprises a bottom tray 135 shaped generally like a Bundt pan with an annular shaped bottom 137, a cylindrical outer wall 139 extending upwardly from the outer edge of the bottom 137, and a cylindrical inner wall 141 extending upwardly from the inner edge of the bottom. An inverted cup-like cover 143, with a circular top 145 and downward extending cover wall 147, is disposed over the top edge 149 of the inner cylindrical wall. Under the cover 143 and on the top edge 149 is a disc-shaped labyrinth filter 205. An air flow path is created up from the first liquid filter stage, through a second stage inlet 151 at the junction of the annular bottom 137 and the inner cylindrical wall 141, through the inside annular space of the inner cylindrical wall 141, through the labyrinth filter 205 between the top 145 of the inverted cover 143 and the top 149 of the inner cylindrical wall 141 down between the inner cylindrical wall 141 and the cover wall 147, and under the bottom edge 155 of the cover wall. At the bottom of the cover wall 155 is a generally horizontal and outward extending lip 157. Attached to the lip 157 are downwardly extending fins 159 or vanes. The function of the vanes 159 is to support the inverted cover 143 on the bottom of the annular bottom 137, and to direct the air flow as will be more particularly described below.

In the labyrinth filter 205, particle laden air coming from the first liquid stage is directed through a convoluted or labyrinth path. Suitable labyrinth filter media include, but are not limited to, random non-woven or woven fiber materials of polymeric materials, and open pore foam products, particularly those with a low density, large pores and a generally rigid structure. Materials that absorb water and are flexible and sponge like are not preferred. A suitable material is exemplified by the open pore material available from 3M under the name SCOTCH-BRITE™, which is a rigid, random fiber material of an inert polymeric substance, and is known for its use in floor scrubbing applications. The labyrinth filter is generally circular in shape to fit snugly under the cap 143 and over top edge 149. The media is sufficiently thick to provide a labyrinth filtration function. Thicknesses greater than about 0.75 inches are suitable. Thicknesses between about 1.0 and 1.5 inches are preferred.

On the lower surface of the annular bottom 137 is attached a cage 161 and a float ball 163 that functions as an over-fill safety valve. This is a safety feature that enhances the function of the vacuum apparatus as a wet vacuum system. The bulk of the liquid in the incoming air stream will be retained by the first filter stage 103 and added to the filter medium 125 in the cyclone chamber 115. As the fluid level rises from accumulated fluid, a point is reached where, without a safety valve, the mixture of filter medium and retained fluid would become entrained in the air stream flowing to the labyrinth filter and second liquid filter. This would materially compromise the function the succeeding filtration of the system, and allow fluid to be expelled from the vacuum. To prevent this from happening the float ball 163 is provided so that before the fluid can reach this level the float ball approaches the inlet of the second liquid filter stage and becomes entrained in the air stream, forcing it to seat over and seal the inlet 151 of the second liquid stage 105, as shown in phantom. The ball 163 is then held in place by the vacuum above the ball, which disables the system and prevents any air and liquid in the first filter stage from entering the inlet 151.

Placed over the inverted cover 143 are a lower splash plate 167 and an upper splash plate 165. The annular bottom 137, the inner and outer cylindrical walls 139, 141, and the lower splash plate 167 define a dispersion filter chamber 171. A liquid filter medium 169 is placed within the bottom tray 135 to immerse the lip 157 of the inverted cover 143.

During operation of the apparatus, air from the first liquid filter stage 103 enters the second liquid filter stage inlet 151, flows through the annulus of the inner cylindrical wall 141, through the labyrinth filter 205 over the top edge 149 of the inner cylindrical wall 141, down between inner cylindrical wall 141 and the inverted cover 143, and under the lip 157 through the vanes 159 and out directly into the filter medium 169. Directing the air directly into the filter medium 169 (rather than into the space above the medium) creates a very efficient filtering environment in the dispersion chamber 171. The air injected forcefully into and through the filter medium forms bubbles that travel upward and outward through the filter chamber, creating a liquid/air dispersion with a high liquid surface area. Solid particles in the air are thereby efficiently contacted with, and entrained by the liquid filter medium. The air is injected into the medium at sufficient velocity to impart momentum to the filter medium. Dispersed liquid is propelled toward and ricochets from the cylindrical walls 139, 143 and the cover plate which further disperses the air and the liquid. The effect is a violently mixing, undulating two phase mixture of small air bubbles in liquid at the bottom and highly dispersed small fluid drops in air near the lower splash plate 167. The mixing may also be enhanced by ridges 148 or other extensions at the outlet of the air.

Preferably the vanes 159 are angled to direct the incoming air in a tangential direction. This further enhances the dispersion of the liquid and air phase by lengthening the path of the air through the medium before the air reaches the outer wall. The incoming air imparts a circular momentum to the filter medium, which then begins to spin in the bottom tray, which directs the liquid outwardly upon the outer cylindrical wall, creating an undulating wall of liquid. In addition, the spinning fluid and air creates an effect that directs air particles and liquid toward the outer walls. The transition 164 between the outer cylindrical wall and the annular bottom is rounded to assist in the formation of the undulating liquid wall. This effect, together with the undulating wall of liquid and the dispersion effect of the air rising through the medium effectively creates a liquid system that much more effectively contacts and retains solid particles than a simple cyclone where air is directed over the surface of the medium and particles are directed to a solid, periodically wetted, outer wall.

As described above, dispersed liquid is propelled in the dispersion by the energy of the air injection. At the top of the dispersion chamber, dispersed liquid drops impact the underside of the annular lower splash plate 167. The liquid drops with entrained solid particles bounce off, or run down and drip off of the lower splash plate 167, and become further involved in dispersion. A lower annular passage 173 is provided between the inverted cover 143 and the inner edge 175 of the lower splash plate 167. Air passes through this passage 173, and is directed outwardly between the lower splash plate 167 and the overlying upper splash plate 165, and then is redirected through an upper annular passage 174 between the outer edge of the upper splash plate and the outer cylindrical wall of the bottom tray. Liquid medium still retained in the air impacts and adheres to the underside of the upper splash plate 165, the upper side of the lower splash plate 167, and adjacent surfaces and is collected by and runs down the upper surface of the lower splash plate 167. The outer edge of the lower splash plate is loosely fitted between the outer cylindrical wall allowing liquid flowing down the top of the lower splash plate to flow over the outer edge of the first splash plate into the dispersion chamber. A cover plate 177 extends between the top edge 179 of the outer cylindrical wall 139. The cover plate includes a central aperture 181 for exit of the particle depleted air from the second liquid filter stage.

The second liquid filter stage 105, along with the labyrinth filter 205, is placed circumferentially within the first filter stage 103 to save space and provide an efficient system for cleaning and maintenance of the vacuum apparatus. The bottom tray 135 of the second liquid filter stage comprises an outer annular lip 183 that fits over the top edge 185 of the extended side wall 119 of the cyclone chamber 115 of the first filter stage 103. The cover plate 177 for the second liquid filter stage fits over outer lip 183, and the assembly is joined and secured with releasable tension fasteners 129. A rubber seal 187 is provided at the edge of the outer lip 183 to seal the joinder against air and liquids.

To clean and maintain the vacuum apparatus the fasteners 129 are released and the cover plate 177, the upper splash plate 165 and the lower flash plate 167 are removed in succession. At this point the removed components can be easily cleaned and access to the dispersion chamber 171 is provided. Filter medium may then be added to the second liquid filter stage, or the dirty fluid in the second liquid stage removed by any suitable means. A drain plug may be optionally provided and the fluid removed by pulling handle 191 and removing drain plug 189, allowing the fluid to drain into the first filter stage 103, as shown in FIG. 5.

The labyrinth filter 205 can then be accessed by removing the inverted cup-shaped cap 143. The labyrinth filter 205 may then be removed and cleaned. The labyrinth filter 205 may then be replaced or cleaned by any suitable method, such as under flowing water.

The bottom tray 135 may then be removed, allowing it and the attached cage 161 and float ball 163 to be cleaned, and allowing access to the cyclone chamber 115. Liquid in the cyclone chamber 115 comprising filter medium, entrained solid particles and liquids can then easily be supplemented by new fluid, or dumped. The cyclone chamber can then be easily cleaned if necessary and new fluid poured into the cyclone chamber.

The filter medium for the first and second liquid filter stages may be the same or different, and is a filtering liquid designed to entrain particles. For the first filter stage, the filter medium may be any medium conventionally used for a cyclone vacuum system, such as water, preferably containing surfactants or the like. Preferably, for operational simplicity, the medium for the first filter stage is the same as that of the second liquid filter stage. However, to lower costs, regular water may be used in the first liquid stage, and a more expensive specialized solution used in the second liquid stage.

For the filter medium 169 of the second liquid stage, any suitable medium is contemplated. However, for optimum performance, a specialized solution is preferred. Most filter media suitable for cyclonic vacuums systems and the first filter stage will not optimally perform in the second liquid filter stage. For optimal performance the second liquid stage filter medium should have surfactant, antistatic, and antifoaming properties. The surfactant assists in dispersion of the filter medium, entrainment of the particles by the filter medium, and adhesion of liquid filter medium drops to the surfaces in the dispersion chamber. The antistatic composition reduces generated static electrical charges that may cause particles and filter medium drops to repel each another. An antifoaming composition is required to prevent the foaming of material entrained by the medium and the surfactant that may otherwise occur from the violent mixing and dispersion in the dispersion chamber. The filter medium may also contain a biocide to prevent bacterial and fungal growth and the like in the medium, and a scent to cover unpleasant odors. Agents that assist in agglomerating or precipitating materials entrained in the filter medium may also be required. For example, for plaster board (Sheet-Rock™) dust, which is essentially $CaSO_4$, a calcium chelating agent may be used to precipitate the calcium and prevent it from solubilizing in the medium. The filter medium is preferably nonhazardous and nontoxic and is preferably water based, but other solvent bases are contemplated, as well as mixtures of solvents, for example, water and alcohols, or glycols. Basically, a goal of an optimum filter medium for the second liquid stage is to reduce the natural repelling force between water (and other solvents) and solid particulates in the air. These forces derive from surface tension, static charges, surface incompatibilities between the solid and the solvent, and the like. In addition, foaming should be inhibited because of the violent mixing of the liquid and air phases in the second liquid stage. It is within the skill of a practitioner of ordinary skill to select suitable components and their proportions for the filter medium.

An example of suitable filter medium is first made as a concentrate and later diluted with water. The concentrate comprises propylene glycol, a calcium chelating agent (Hampene NTA 150), a silicone defoaming agent, a surfactant, and a quaternary amine bactericide. The concentrate is then diluted with water at a suitable ratio, approximately 1 to 10 parts, but typically 5 parts water to 1 part concentrate. The propylene glycol promotes wetting by reducing the surface tension of water and also reduces evaporation of the water. The defoaming agent inhibits foaming and assists in wetting and precipitating the particles.

Figure 6:
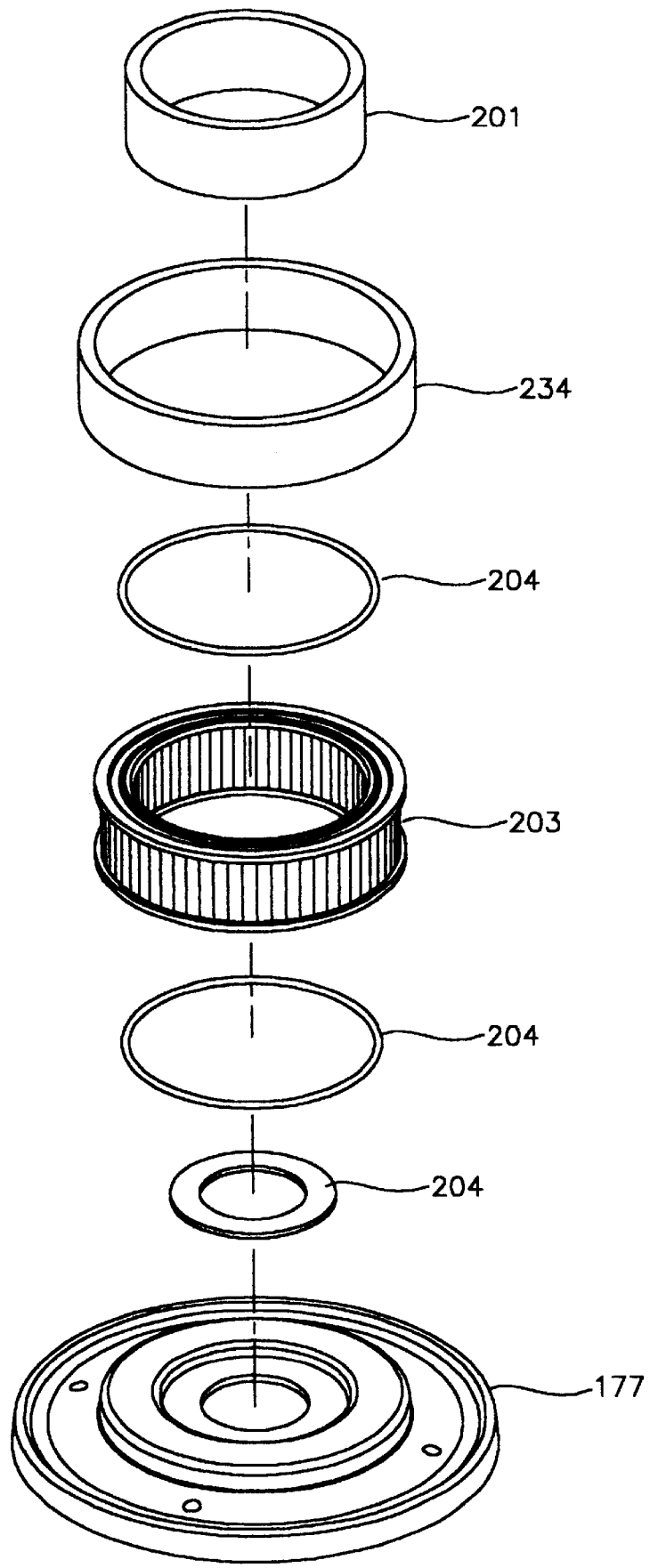
FIG. 6 is an exploded view of the third or mechanical filter stage of the apparatus of FIG. 1.
Figure 7:
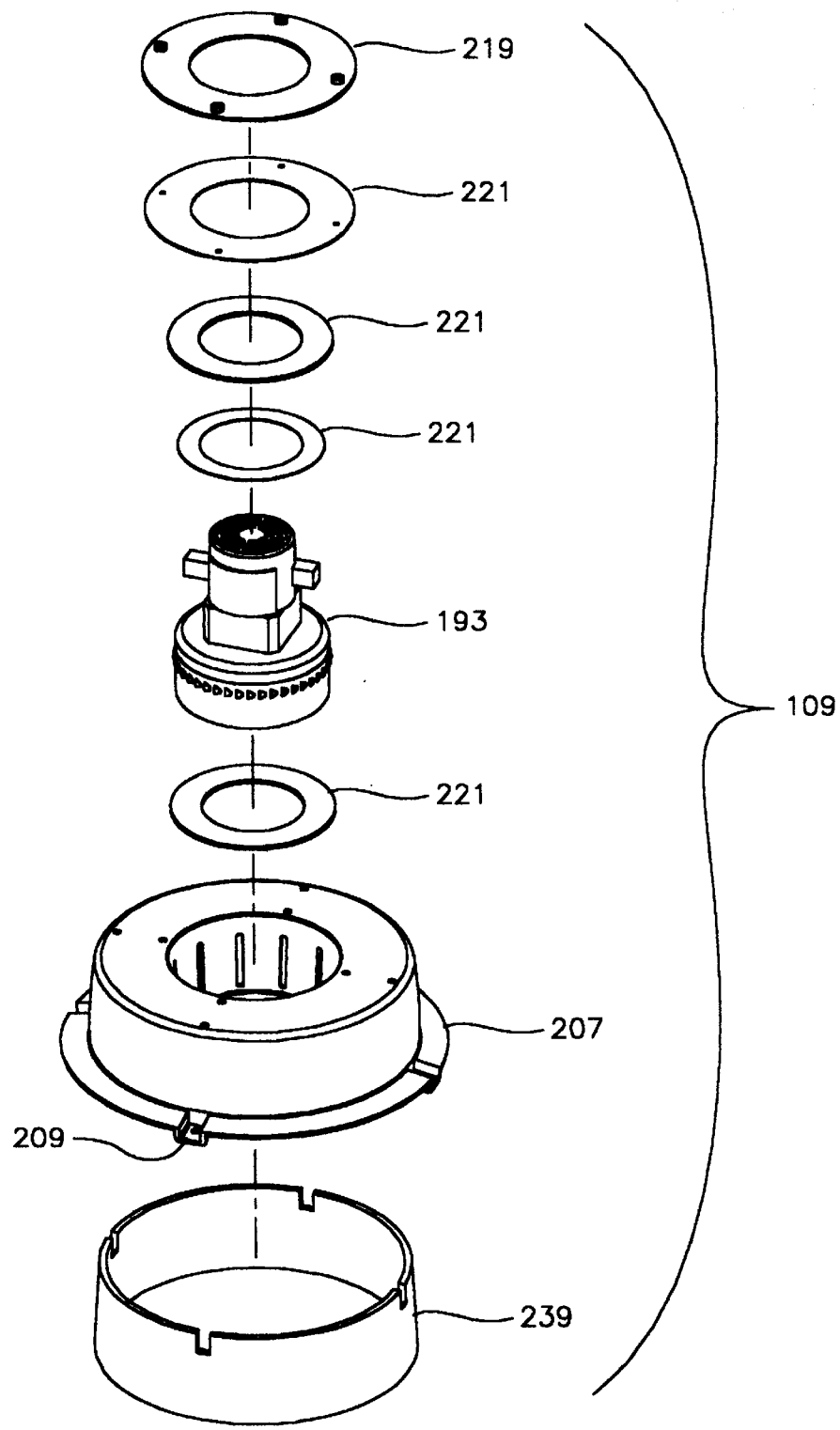
FIG. 7 is an exploded view of the motor section of the apparatus of FIG. 1.
Figure 8:
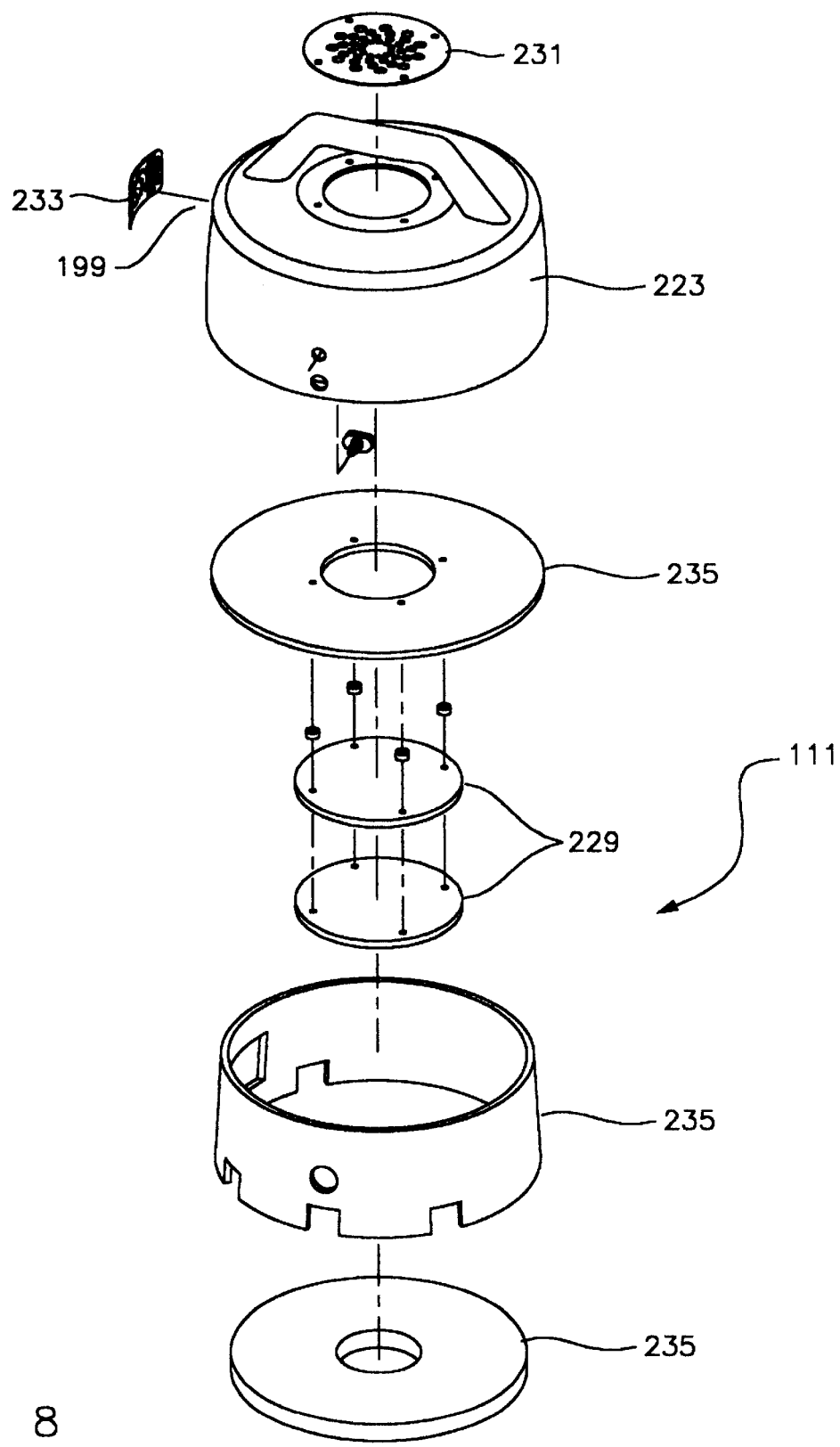
FIG. 8 is an exploded view of the top cover of the apparatus of FIG. 1.

Referring to FIGS. 1 and 2, and also FIGS. 6 to 8 which are exploded views of the mechanical section 107, the fan section 109, and the top cover 111, respectively, of the third filter stage 106. The air leaving the second liquid stage enters a third filter stage 106 comprising the fan section 109, and mechanical filter section 107. The fan section comprises a cylindrical fan impeller 193 of conventional design for creating a vacuum, which is the driving force for drawing air though the vacuum system. Air is drawn from the second liquid filter stage 105 through the center aperture 181 and through the fan impeller 193. The fan impeller 193 is driven directly by a high capacity drive motor 195. The motor is air cooled from an air stream independent from the filtered air stream. The cooling air is drawn through top apertures 197 to the motor and directed out through a side vent 199.

From the fan impeller 193 the filtered air is forced through apertures into the mechanical filter stage comprising mechanical filters for removing ultra-fine particles. Depending on the application, the filters may, for example, be for small particles in the micron range (about 1 to 10 microns) or be submicron filters, such as those of the HEPA design. The present invention efficiently utilizes this filter medium as essentially all of the larger particles have already been removed in the first and second liquid filter stages, leaving essentially only a remnant of ultra-fine particles. The filters are not prematurely filled and clogged by filtration of the large particles. Accordingly the filters last longer, due in part because they used primarily for their best function, which is to remove ultrafine particles. The mechanical filter section 107 comprises an inner annular ring of filter material 201, and an outer annular filter ring 203, which is secured in place by gaskets 204. An outer ring 234 of a diffuser medium acts as both a filter and a motor noise suppressor.

The fan section 109 comprises a shell 207 that is shaped similar to an inverted Bundt pan with holes 209 for mounting by screws to the cover plate 177 on the second liquid filter stage (also in FIG. 3) also acts as a bottom mounting plate for the fan and mechanical filters. A gasket 211 seals around the central aperture 181. The shell 207 comprises an inverted U-shaped channel 213 for enclosing the filters and air inlet apertures 215 for air passage between the fan impeller 193 and the mechanical filter section, and outlet apertures 217 to allow the filtered air to exit the mechanical filter section. The motor 195 with fan impeller 193 is attached to the shell 207 by screw fasteners and mounting plate 219, using appropriate gaskets 221 to secure the motor and seal the filtered air passages from the motor cooling air passages.

The top cover 111 comprises a cover shell 223 with the cooling air inlet and exit apertures 197, 199. The top cover protects the motor and defines the air passages for cooling the motor. The inlet aperture 197 is provided with simple frequency dampeners 229 and cover screen 231. The exit aperture 199 also provided with a screen 233. The top cover is mounted to the shell 207 by appropriate screw fasteners. Noise suppression materials 235 are provided, as appropriate in the top cover and the fan sections to suppress fan and motor noise.

The components of the vacuum apparatus of the invention may be manufactured of any suitable material with suitable strength and corrosion resistance to the materials being drawn and entrained in the apparatus, such as but not limited to metal and plastic materials. A preferred material is a high-strength, corrosion resistant plastic, such a polyethylene or polypropylene, formed by conventional molding techniques. The size of the apparatus is chosen for its intended use, considering capacity, portability, etc. An apparatus essentially as described above in the Figures (which are essentially scale) was built that was 23 inches high and 18 inched in diameter.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. An ultrafiltration vacuum cleaning system comprising;
   a first liquid stage filter comprising structure to direct particle laden air into a vortex in a circular cyclone chamber over a surface of a first liquid medium to direct particulates in the air to a wall of the cyclone chamber for collection by the first liquid filter medium and to create sufficient turbulence in the liquid medium to at least periodically wet the wall,
   an open-pore labyrinth filter for filtering air coming from the first liquid stage, which provides a convoluted path through which the air passes,
   a second liquid stage filter for filtering air coming from the labyrinth filter and comprising a dispersion chamber with an inlet that directs the particle laden air from the labyrinth filter directly into a second liquid filter medium to transfer momentum of the air directly into the second liquid filter medium, the dispersion chamber constructed with surfaces against which the second liquid filter medium is propelled by the energy of the injected air to disperse the medium in the air, surfaces upon which water droplets dispersed in air leaving the second liquid stage impact and become retained to remove essentially all of the liquid droplets in the air coming from the second liquid stage.

2. An ultrafiltration vacuum cleaning system as in claim 1 additionally comprising;

a mechanical filter stage following the second liquid filter and the surfaces for removing liquid droplets the mechanical filter stage for removing fine particles from liquid-free, particle depleted air coming from the second liquid stage.

3. An ultrafiltration vacuum cleaning system as in claim 1 wherein the first and second liquid filter media are the same or different and comprise water.

4. An ultrafiltration vacuum cleaning system as in claim 3 wherein the filter media additionally comprises one or more substances functioning as one or more of a low-sudsing agent, a surfactant, a disinfectant, an anti-static agent, and an odor-modifying agent.

5. An ultrafiltration vacuum cleaning system as in claim 1 wherein a check valve is disposed after the first liquid stage to prevent air and fluid from passing into the labyrinth filter and the second liquid stage when fluid level in the first liquid medium rises to a predetermined level.

6. An ultrafiltration vacuum cleaning system as in claim 1 wherein the dispersion chamber is generally cylindrical about a vertical axis with generally vertical side walls and the air inlet is constructed and configured to inject air into the liquid medium in a tangential direction to create an action that forces liquid medium to flow upon the vertical side walls and form a cascading liquid surface.

7. An ultrafiltration vacuum cleaning system as in claim 1 wherein the second liquid stage filter comprises structure for directing the air into the second liquid medium through vanes that direct the air and transfer momentum to the second liquid medium in a tangential direction.

8. An ultrafiltration vacuum cleaning system as in claim 1 wherein the dispersion chamber comprises a circular bottom and cylindrical side wall with a rounded transition between the circular bottom and side wall.

9. An ultrafiltration vacuum cleaning system as in claim 1 wherein at least a portion of the surfaces against which liquid is propelled are provided by one or more splash plates.

10. An ultrafiltration vacuum cleaning system as in claim 9 wherein the one or more splash plates provide surfaces that collect liquid upon which the liquid flows to be further dispersed in the dispersion chamber.

11. An ultrafiltration vacuum cleaning system suitable for both wet and dry cleaning applications that comprises a series of stages ordered for optimum removal of air-entrained liquid or solid particles from a particle laden air stream, the stages in succession comprising:

a first liquid stage where particles are extracted by directing particle laden air into a vortex over a surface of a first liquid medium in a cyclone chamber sufficient to create turbulence in the liquid;

a labyrinth filter stage where particles are removed by directing the air coming from the first liquid filter through a labyrinth filter comprising convoluted labyrinth passages;

a second liquid stage where particles are removed by directing air coming from the labyrinth filter into a dispersion zone of air and a liquid second medium, surfaces upon which liquid droplets in air from the second liquid stage impact and are retained to remove essentially of the water droplets from air coming from the second liquid stage.

12. An ultrafiltration vacuum cleaning system as in claim 11 additionally comprising a mechanical filter stage following the second liquid stage and the surfaces for removing the water droplets for removing fine particles from liquid-free, particle depleted air coming from the second liquid stage.

* * * * *